(12) United States Patent
Greifeneder

(10) Patent No.: US 7,957,934 B2
(45) Date of Patent: Jun. 7, 2011

(54) METHOD AND SYSTEM FOR PROCESSING APPLICATION PERFORMANCE DATA OUSIDE OF MONITORED APPLICATIONS TO LIMIT OVERHEAD CAUSED BY MONITORING

(75) Inventor: Bernd Greifeneder, Linz (AT)

(73) Assignee: dynaTrace software GmbH (AT)

( * ) Notice: Subject to any disclaimer, the term of this patent is extended or adjusted under 35 U.S.C. 154(b) by 442 days.

(21) Appl. No.: 12/120,645

(22) Filed: May 15, 2008

(65) Prior Publication Data

US 2008/0288212 A1 Nov. 20, 2008

Related U.S. Application Data

(60) Provisional application No. 60/917,947, filed on May 15, 2007.

(51) Int. Cl.
*G06F 15/00* (2006.01)
(52) U.S. Cl. ...................................... 702/182
(58) Field of Classification Search .................. 702/182
See application file for complete search history.

(56) References Cited

U.S. PATENT DOCUMENTS

2005/0283522 A1* 12/2005 Parkkinen et al. ............ 709/210

OTHER PUBLICATIONS

Andrew Z. Tabona, Windows 2003 performance monitor, p. 1-8, Publish Mar. 29, 2004.*

* cited by examiner

*Primary Examiner* — Tung S Lau
(74) *Attorney, Agent, or Firm* — Robert Plotkin, P.C.

(57) ABSTRACT

The present invention provides a system and method that aggregates and processes monitoring data acquired inside a monitored application outside of the said application to reduce overhead caused by monitoring tasks in the monitored application. Monitoring data acquired by monitoring sensors is stored in a ring buffer after acquisition, which decouples acquisition of data and its transfer, enabling asynchronous sending of performance data to a monitoring server for analysis. Memory consumption of said ring buffer is limited to a fixed size which keeps memory consumption caused by monitoring processes low and predictable. Correlation, analysis, all computation of monitoring data, and bytecode manipulation to place sensors is performed outside of the monitored application, by a monitoring server.

42 Claims, 9 Drawing Sheets

Outside Application Measure Evaluation

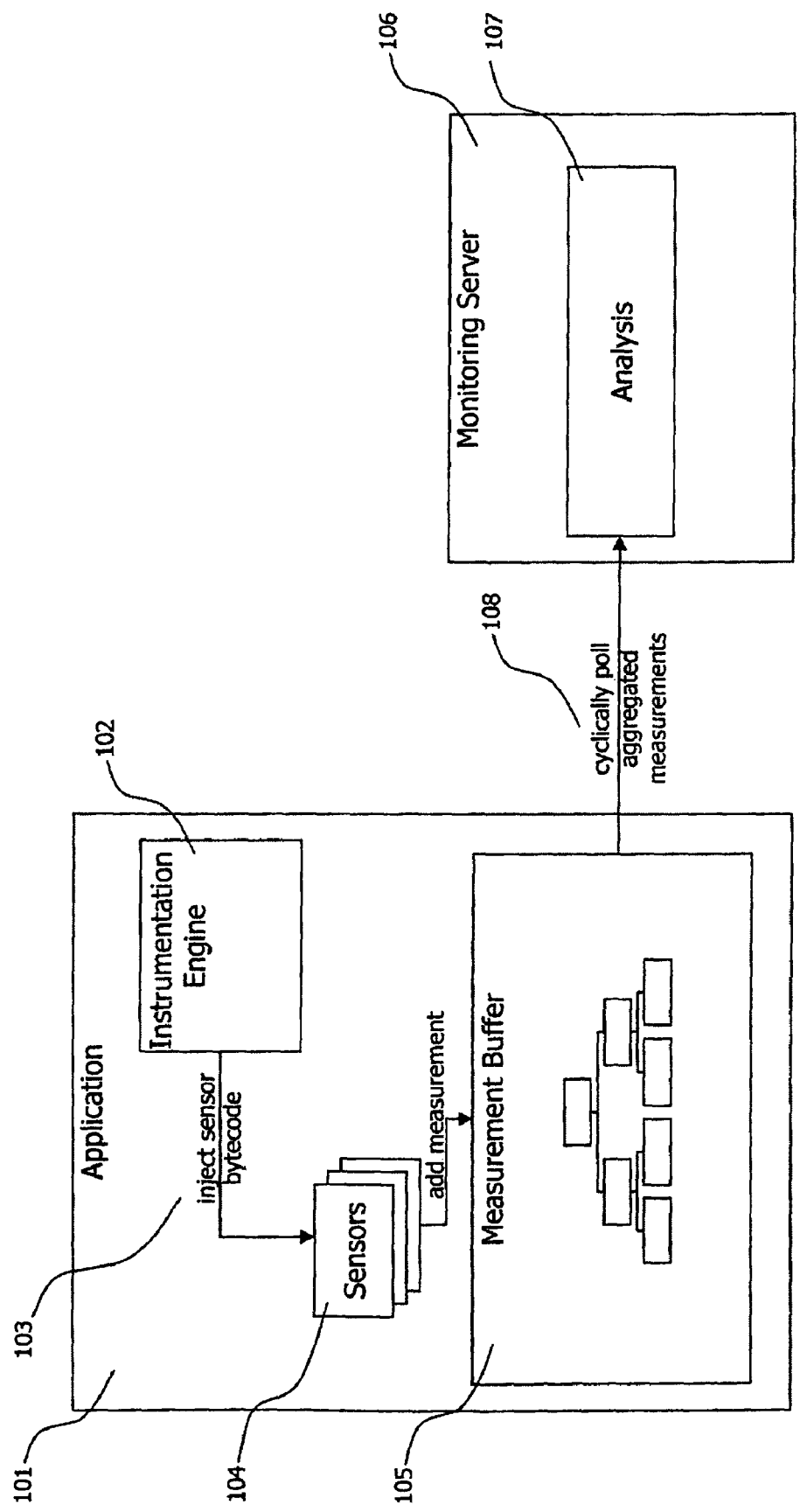
FIG 1: Prior Art

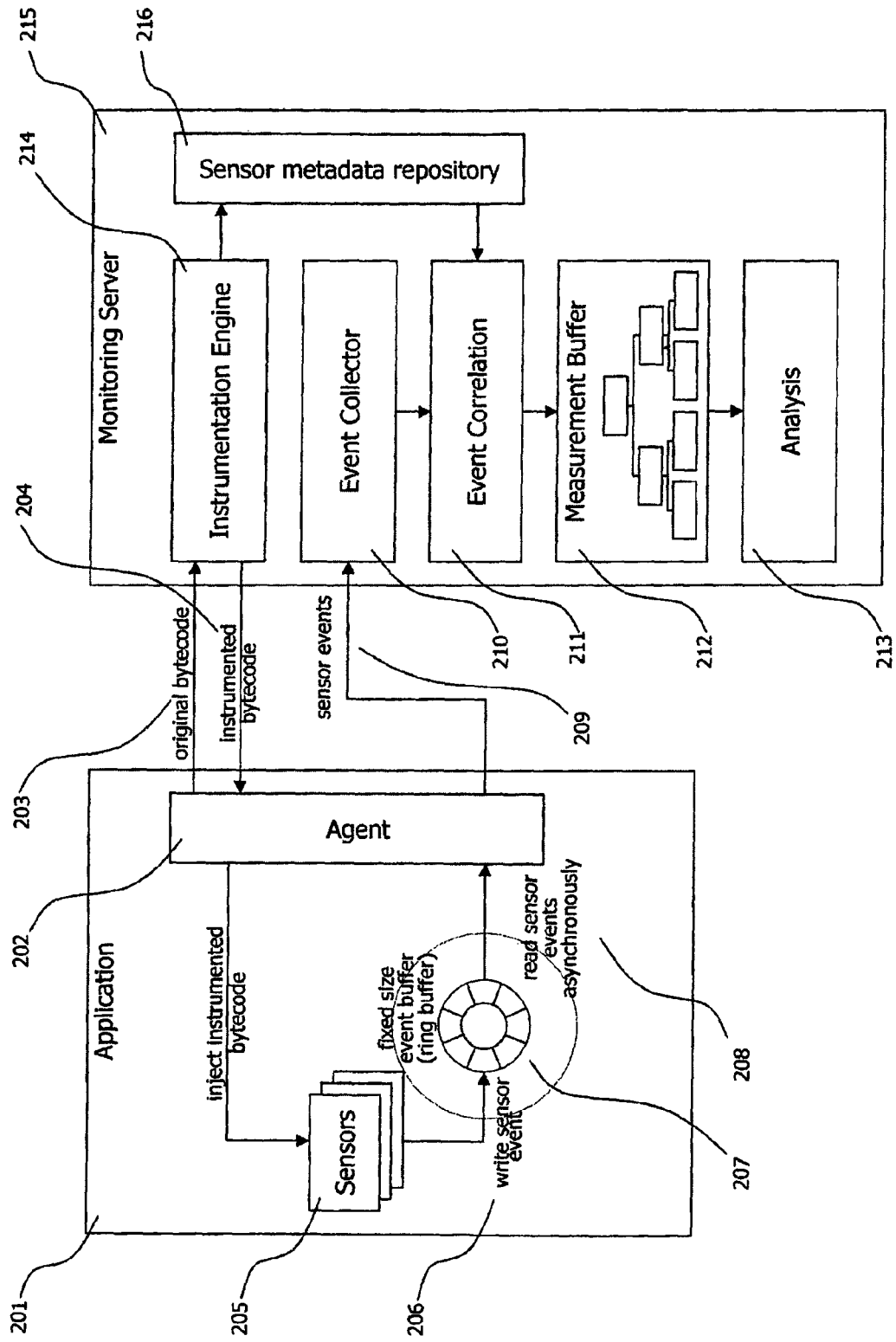
FIG 2: Outside Application Measure Evaluation

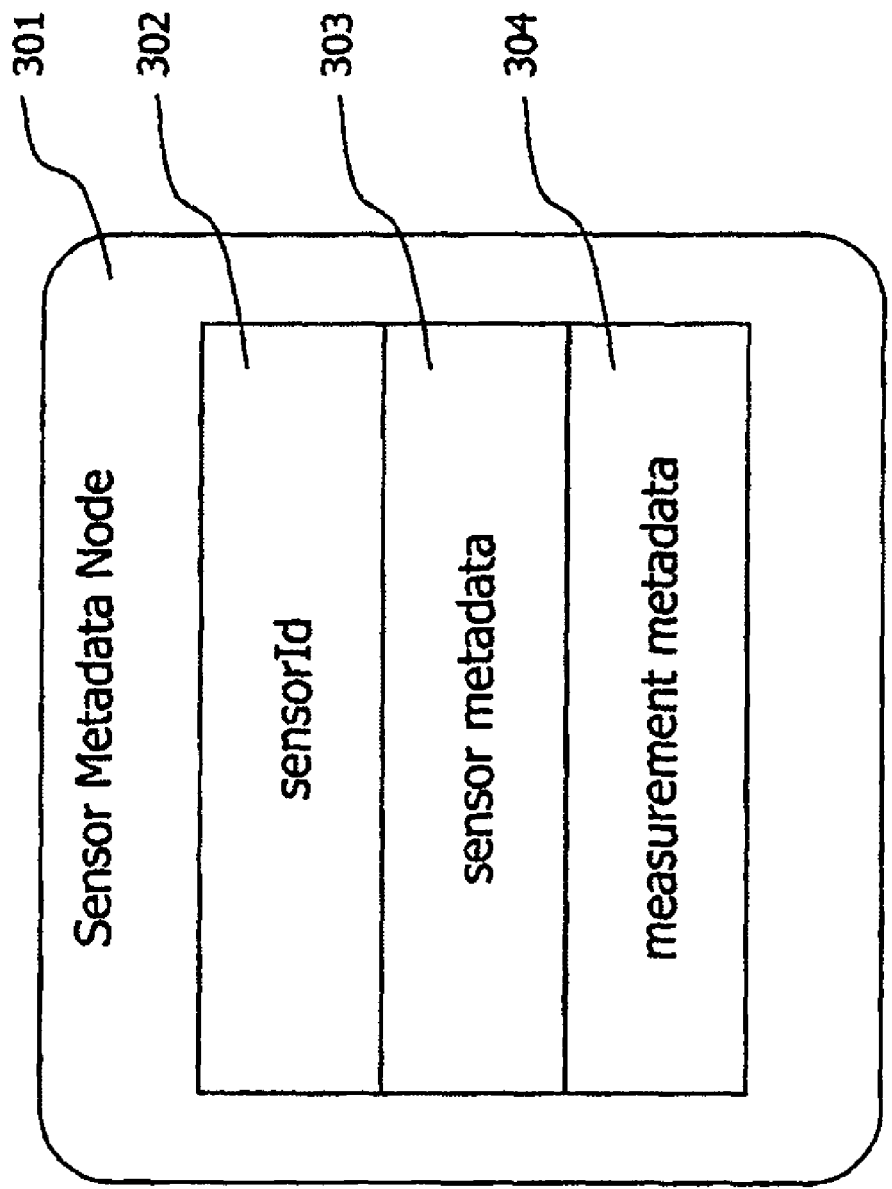

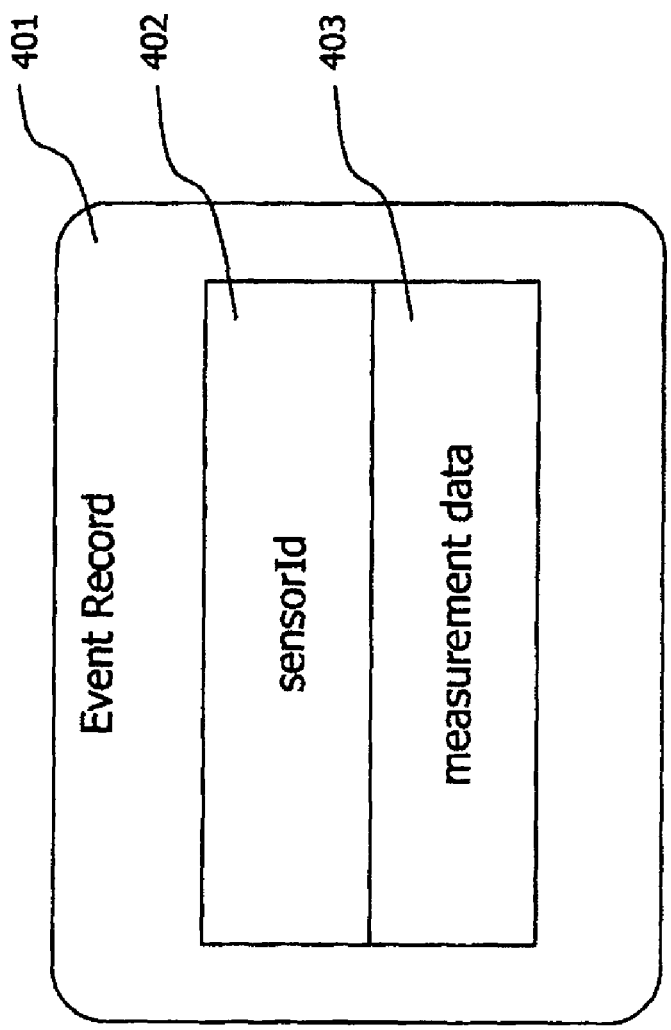

FIG 5: Out of Application Instrumentation

FIG 5a: Agent side virtual machine initiates bytecode loading

 → agent intercepts loading and captures original bytecode → agent sends original bytecode to monitoring server for instrumentation → agent receives instrumented bytecode from monitoring server → agent forwards instrumented bytecode to bytecode loading process which loads instrumentedbytecode instead of original bytecode → 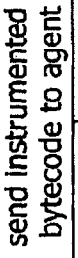

FIG 5b: Instrumentation Engine side monitoring server receives original bytecode for instrumentation

 → forward original bytecode to instrumentation engine → extract metadata from original bytecode → select methods to instrument → insert parameterized sensor in method bytecode → send instrumented bytecode to agent → 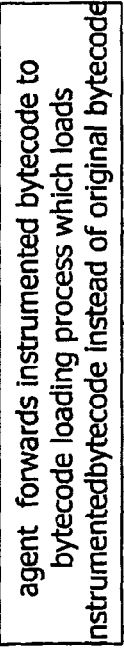

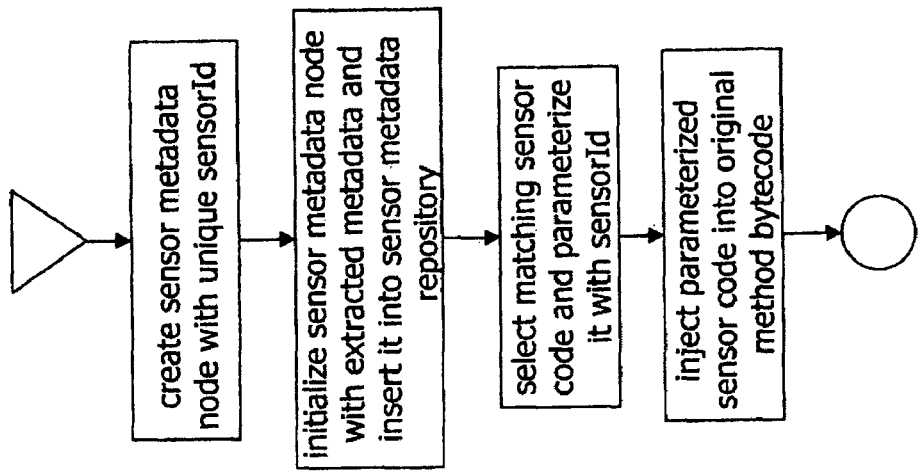
FIG 6: Insert Parameterized Sensor Code

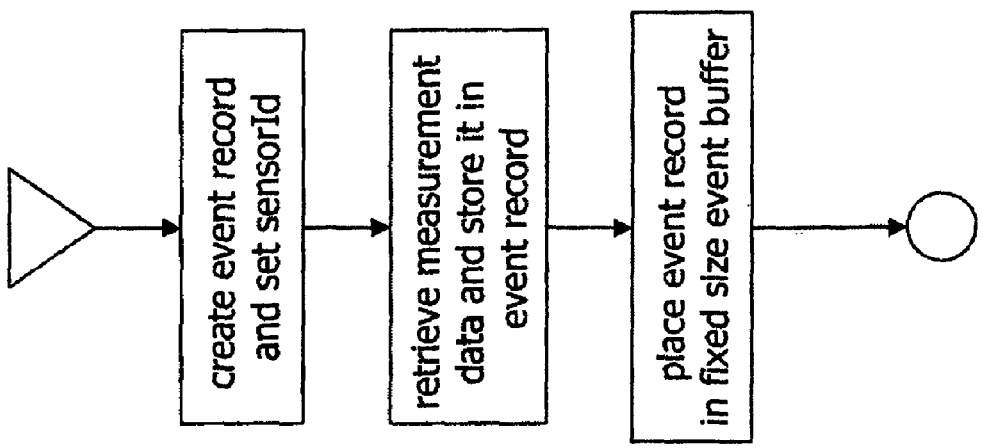
FIG 7: Sensor execution

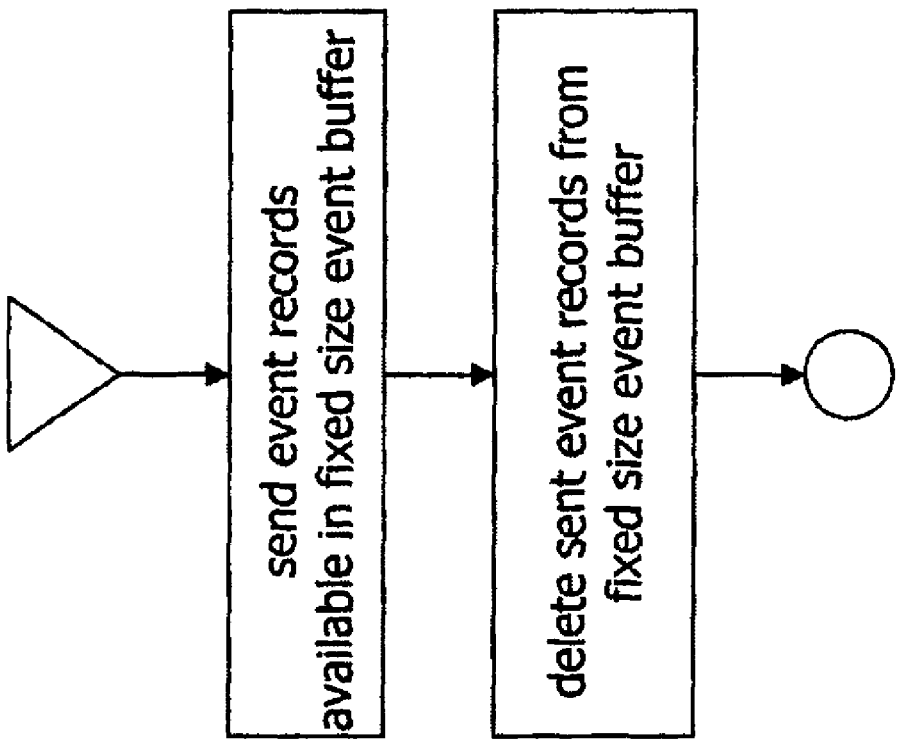
FIG 8: Transfer measurement data

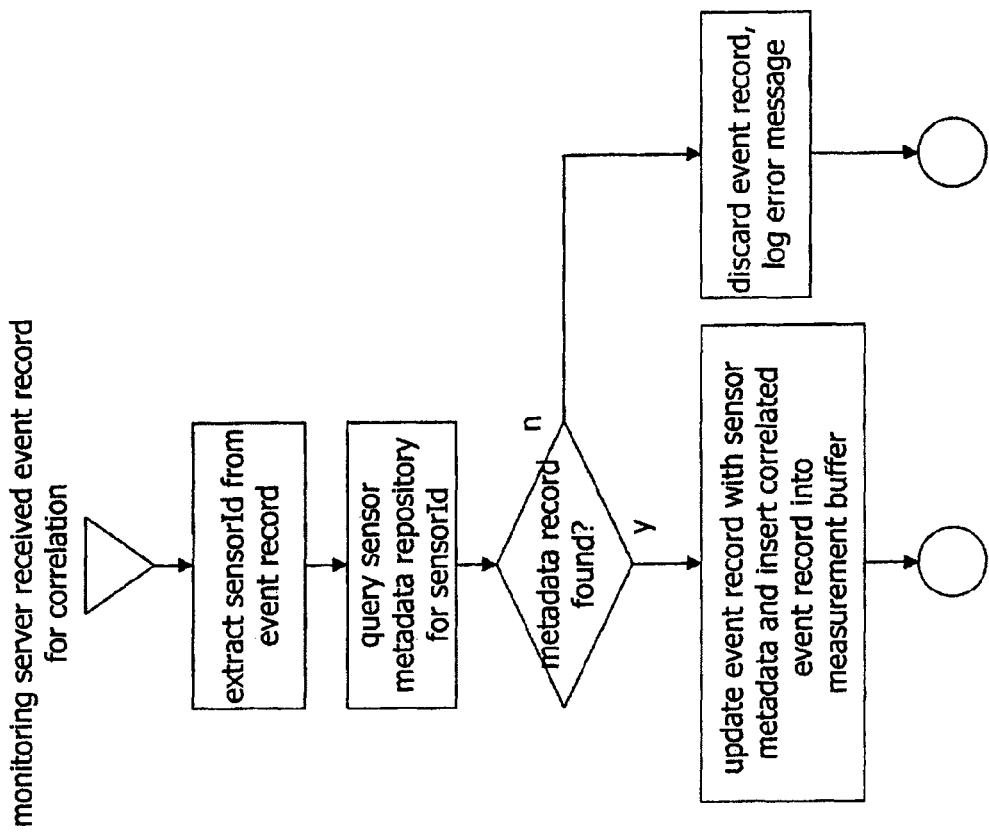
FIG 9: Correlate Event Data

METHOD AND SYSTEM FOR PROCESSING APPLICATION PERFORMANCE DATA OUSIDE OF MONITORED APPLICATIONS TO LIMIT OVERHEAD CAUSED BY MONITORING

PRIORITY

The present invention claims priority under 35 USC section 119 and based upon provisional application with a Ser. No. of 60/917,947 which was filed on May 15, 2007.

FIELD OF THE INVENTION

Present invention is directed to systems for software application performance monitoring, which acquire performance measurement data inside the monitored application and provides a method for aggregation, correlation and evaluation of said performance measurement data outside the monitored application to keep the overhead caused by monitoring related tasks low.

BACKGROUND OF THE INVENTION

Current bytecode instrumentation based performance monitoring tools provide performance data at a fine grained level, down to data describing single method calls. Information at this detailed level is a great improvement to find and eliminate performance problems more quickly and efficiently.

The acquisition of such high-quality information requires the placement of a large quantity of bytecode instrumentations for performance monitoring which are injected into the bytecode of the monitored application. This multitude of monitoring sensors also creates a large amount of measurement data which has to be aggregated and analyzed.

Current byte code instrumentation based performance monitoring tools perform instrumentation of application bytecode inside the monitored application and also aggregate measurement data within the memory of the monitored application. Although this approach eases interpretation of the measurement data because correlation between acquired measurement data and the sensor that created the data and its context can be easily performed, it creates considerable overhead in terms of processing time and memory consumption.

Especially capturing of SQL statements and monitoring the execution of said SQL statements creates significant memory overhead, because SQL statements typically consist of long strings and capturing those strings requires a considerable amount of memory. In the worst case, excessive capturing of SQL statements may cause an out of memory error which may lead to a crash of the monitored application.

Consequently, an alternative approach is required which transfers measurement data out of the monitored application after acquisition to keep memory overhead low and to guarantee that a maximum memory overhead is not exceeded at any time. Additionally, the new approach should allow performing bytecode instrumentation outside of the application to reduce the processing overhead caused by bytecode instrumentation.

Current approaches which transfer measurement and logging data from a monitored application to a centralized server which aggregates and correlates the measurement data, like distributed logging systems or the monitoring framework of TPTP, a plug-in to the well known eclipse development environment, generate significant overhead in terms of network traffic. The reason for this overhead is redundant context data sent together with measurement data because those approaches retransfer context information required to interpret that measurement data with every captured measurement.

An alternative approach should also reduce the network overhead generated by transferring the measurement data, by storing context information required to interpret captured measurement data, and reuse this stored context information whenever this is possible instead of retransferring it every time measurement data is sent.

SUMMARY

A method for dynamically injecting an agent into an application may include the steps of connecting a bootstrap agent to the management server from a virtual machine, the management server being external to the virtual machine, initiating connections with the management server, requesting a handshake between the management server and the virtual machine by the bootstrap agent in response to the connections, determining matching in process agent binaries in response to the handshake and installing the in process agent binaries to the application of the management server.

The step of verifying that the version of the connected bootstrap agent may be supported by the management server, and the step of initiating connections includes the step of verifying that the version of the virtual machine may be supported by the management server.

The version of the bootstrap agent and the version of the virtual machine may be used to determine the matching in process agent binaries, and the format of the game process agent binaries may be determined.

The format of the in process agent binaries may be byte code, and the format of the in process agent binaries may be native code.

The byte code may be a single byte code in process agent binary and the native code may be a single native code in process agent binary.

BRIEF DESCRIPTION OF THE DRAWINGS

FIG. 1: illustrates conceptually a monitoring system using in-application instrumentation of sensors, storage and aggregation of measurement data inside the monitored application. A monitoring server cyclically polls measurement data aggregated within the monitored application for analysis.

FIG. 2: depicts a preferable embodiment of the present invention, using out of application instrumentation and out of application storage and aggregation of measurement data. An agent is deployed to the application which manages instrumentation of sensors outside the application and cyclically sends measurement data to a monitoring server. Intermediate buffering of measurement data inside the application uses a ring buffer of fixed maximum size which limits the maximum memory required to store measurement data within the application.

FIG. 3: shows the preferred embodiment of a sensor metadata node which contains metadata describing placed sensors and the measurement data provided by said sensors.

FIG. 4: depicts the preferred embodiment of an event record. Event records are used to send measurement data from the application to the monitoring server for correlation and analysis.

FIG. 5: shows the process of instrumenting application code with sensors outside the application.

FIG. 6: depicts the process of creating sensor metadata and creating and injecting sensor code which is parameterized with a sensorId.

FIG. 7: displays conceptually the process of executing an instrumented sensor, including creation, initialization and storage of an event record representing the current measurement.

FIG. 8: displays the process of cyclically sending event records from the application to the monitoring server, as performed by the agent.

FIG. 9: depicts the process of correlating incoming event record data with matching sensor metadata and inserting correlated measurement data into the measurement buffer of the monitoring server.

DETAILED DESCRIPTION

The present invention provides a system and method to dynamically inject monitoring bytecode (said monitoring bytecode is further referred to as sensor) into the bytecode of an application. The injection of the sensors is performed outside of the application to keep the overhead caused by monitoring low.

A method to process application performance data may include the steps of injecting an agent into a monitored application, the agent is capturing byte code the monitored application is going to load; the agent is sending the captured byte code of the monitored application to a monitoring server external to the monitored application. The monitoring server may generate instrumented byte code from the captured byte code by augmenting the captured byte code with sensor byte code and send the instrumented byte code back to the agent. The agent may provide the instrumented byte code to the monitored application, which loads the instrumented byte code instead of the captured byte code. During instrumentation of a specific portion of byte code, metadata describing the instrumented byte code portion, like class name or method name, together with information about the injected sensor byte code may be created, assigned with an unique sensorId, and stored in a sensor metadata repository located at the external monitoring server. The injected sensor byte code may be parameterized in a way that it tags each measurement data item with the unique sensorId that identifies the portion of byte code to which it is deployed.

When instrumented byte code is executed, one or more sensors may be executed and generate measurement data.

The measurement data generated by the sensors may be inserted into event records, together with the unique sensorIds of the executed sensors.

The sensors may write the event record into an event buffer of fixed size. After the event records are stored, execution of byte code of the monitored application is continued, no blocking of the execution occurs.

The event buffer may be implemented as a ring buffer of fixed size.

While sensor may write sensors write event records to the ring buffer, the agent may concurrently and asynchronously read event records from the ring buffer and may remove read out event records from the ring buffer.

If a sensor writes an event record to the ring buffer while it is full, the ring buffer may discard the received event record to guarantee predictable maximum memory overhead.

The monitoring server may receive the sensor events sent by the agent, and forward them to the event collector which buffers received event records.

The event correlation module may cyclically poll the event collector, correlate the received sensor events with the sensor metadata identified by the sensorIds of the received sensor events and put the correlated sensor event/sensor metadata pairs into the measurement buffer.

An analysis module may process the sensor event/sensor metadata pairs and perform various anaylsis tasks based on the data stored in the measurement buffer.

The measurement data may include sensor data, and the measurement data may include a unique ID.

The measurement data may include sensor data and a unique ID, and the sensor data and the unique ID is combine to obtain a performance measurement, and the data set of fixed size may include a ring buffer.

The data set may be adapted to be asynchronous read out, and the sensor data may include counting sensor data.

The sensor data may include timing sensor data, and the agent may capture the byte code by interrupting the loading of the byte code.

The method may include the step of extracting metadata from the byte code, and the metadata may be used to select a method.

The method may include a comparing method, and the method may include a rule-based method.

An event record may be placed within the database of fixed size, and the monitoring server may collect the event record.

The monitoring server may compare the sensor ID of the event record with stored sensor ID in order to determine if the event is to be measured, and the event record may be discarded if the sensor ID of the event record does not match the stored sensor ID.

The method may include the step of bypassing placing the measurement data into the data set if the capacity of the data set has been exceeded.

The measurement data generated by those sensors is stored in a buffer of fixed size which makes the monitoring caused memory consumption predictable and limits the size of the memory overhead to the size of the buffer. Said buffer is cyclically and asynchronously read out, and the contained measurement data is transferred to a monitoring server outside the application to perform all monitoring related calculation, correlation and analysis tasks. Asynchronous reading of the buffer decouples acquisition of measurement data from its further processing. Decoupling of measurement data acquisition and processing in turn allows processing of the measurement data outside of the monitored application, and prevents that the monitored applications gets blocked by transportation or processing of the measurement data.

The monitoring related network traffic is reduced by a redundancy less design of the protocol that conveys measurement data from the application to the monitoring server. Data describing the context of placed sensors is extracted during the placement of the sensor and stored at the monitoring server. A unique ID is assigned to each stored context data entity. Measurement data is tagged with this unique ID, which identifies the context data of the sensor that generated the measurement data and thus allows the reconstruction of the context of the measurement data, without repetitively sending sensor context data additionally to measurement data.

An agent is injected into the monitored application which intercepts loading of bytecode, captures the bytecode and sends the captured bytecode to a monitoring server for instrumentation. The monitoring server inserts sensor byte code into the received bytecode and extracts and stores context information related to the inserted sensors. The instrumented bytecode is sent back to the agent, which forwards it to the application runtime. The application in turn loads the instrumented bytecode instead of the original bytecode.

If instrumented bytecode is executed, the injected sensors perform measurements and store the acquired measurement data, together with an unique ID that identifies the context of the sensor in a buffer which is provided by the injected agent. The capacity of said buffer is limited to a predefined size to guarantee that memory overhead remains below a certain limit.

The agent asynchronously and cyclically sends measurement data accumulated in said buffer to the monitoring server. The monitoring server receives the sent measurement data and uses the ID received with the measurement data to find the context information related to the sensor that generated the measurement. Measurement data, together with the sensor context information is used to perform various performance analyses.

Acquisition of application performance data has always been an important but also difficult task, because efforts to gain said performance data may change the behavior of the monitored application which also impacts the acquired performance data. In the worst case, performance monitoring may cause malfunction or even a crash of the application.

Bytecode based software platforms like Sun Microsystems' Java or Microsoft's .NET framework provide interfaces to intercept class loading events and to alter the bytecode of the loaded class before it is loaded into memory. Additionally those frameworks enable restricted altering of bytecode that is already loaded into the runtime environment. Open and documented bytecode formats enable analysis of bytecode and selective altering said bytecode. These features enable the creation of monitoring systems that instrument application code with performance monitoring data on the fly, without the need to alter application source code.

Such systems ease the task of application performance monitoring because relatively little preparation of the monitored application is required. On the other hand, such monitoring systems create significant monitoring related overhead in terms of processing time required to perform bytecode instrumentation. Additionally, storage of acquired measurement data consumes memory inside the monitored application.

The described exemplary embodiment provides a system that performs instrumentation of application bytecode and aggregation of performance measurement data outside of the monitored application and performs aggregation and all computation of measurement data outside of the monitored application to keep the overhead caused by monitoring low.

Referring now to FIG. 1, therein an approach is shown using prior art solutions to place sensor code and to aggregate measurement data, as it is used by most current monitoring systems. An instrumentation engine 102 is loaded by the application which injects sensor bytecode 103 into application code. The injected sensors 104 generate measurement data, which is aggregated in a measurement buffer 105 which resides in the process of the monitored application 101. An external monitoring server 106 with an analysis module 107 cyclically polls the measurement buffer 105 to obtain data for performance analyses.

This approach shows various shortcomings. First, the instrumentation engine which is deployed to the application must provide functionality to parse and analyze bytecode of the application and to inject sensor bytecode into bytecode of the application 101. Code representing this functionality must be deployed to and executed in the monitored application. Additionally, the bytecode representing all sensors must be known by the instrumentation engine and thus must also be deployed to the application. These requirements result in a fat instrumentation engine, which performs all instrumentation tasks within the process of the monitored application 101, generating significant processing overhead.

The measurement buffer 105 which resides in the memory of the monitored application 101 is another source of overhead caused by this approach because said measurement buffer requires a considerable amount of memory. Additionally, the measurement buffer 105 may cause erroneous behavior of the monitored application 101, up to an application crash, because peak memory consumption of the measurement buffer 105 is not predictable. If the load handled by the application increases, the amount of memory required by the measurement buffer also rises, as the increased load causes more activity of the monitored application which in turn causes more acquired measurement data. The increased memory consumption caused by the measurement buffer may in the worst case lead to a crash of the application, due to an out of memory error.

Although the monitoring server 106 cyclically reads out and clears the measurement buffer 105, the probability of an application crash caused by a growing measurement buffer 105 can not be excluded. Increasing the polling frequency of the monitoring server 106 may reduce the probability of an application crash, but it can not eliminate the possibility of an application crash caused by monitoring overhead. An alternative solution that limits the memory consumption caused by monitoring processes to a predictable maximum is required.

Referring now to FIG. 2, therein a block diagram of the present invention is depicted. An agent 202 which is deployed to the application monitors and intercepts loading of bytecode, captures the original bytecode 203 and sends said original bytecode 203 to a monitoring server 215 for instrumentation. The monitoring server 215 forwards the original bytecode 203 to an instrumentation engine 214 which parses the original bytecode 203 to extract metadata from said original bytecode 203 and to inject sensors 205 into the original bytecode 203. Each injected sensor is assigned a unique sensorId 302, and the metadata extracted from the original bytecode is stored within a sensor metadata node 301, which is assigned the same sensorId 302.

Said sensor metadata node 301, which allows identifying injected sensors and measurement data generated by those sensors, is inserted into a sensor metadata repository 216. The instrumented bytecode 204 is sent back to the agent 202, which forwards it to the virtual machine to finalize loading of bytecode. The instrumented bytecode 204 is loaded instead of the original bytecode 203, and the injected sensors 205 start monitoring application performance.

The agent 202 additionally provides a fixed size event buffer 207 which may be implemented as a ring buffer, to temporarily buffer measurement data generated by sensors in the application 201. Sensors 205 acquire measurement data 403 and encapsulate it in sensor events 401, together with a sensorId 402, which is later used to reconstruct the context of the sensor 205 that generated the sensor event. The generated sensor event is written 206 into the ring buffer 207 of the agent 202. If the capacity of a fixed size event buffer 207 is reached, new sensor events are discarded; the memory consumption of the fixed size event buffer 207 is not increased. Said ring buffer 207 is cyclically and asynchronous read out 208 by the agent 202 and the buffered sensor events are sent 209 to the monitoring server 215.

The monitoring server 215 forwards received sensor events to the event collector 210 which forwards the sensor events 401 to the event correlation module 211. The event correlation module uses the sensorIds 403 contained in the received sensor events 401 to correlate measurement data enclosed in said sensor events with sensor metadata stored in the sensor metadata repository 216 to reconstruct the semantic of received measurement data. The correlated measurement data is placed in a measurement buffer 212, which is used by the analysis module 213 to analyze received measurement data.

FIG. 3 shows a sensor metadata node 301, which stores data describing instrumented sensors. Sensor metadata nodes are stored in the sensor metadata repository and are used to correlate incoming sensor events with the sensors 205 that generated the events. A sensor metadata node 301 contains a sensorId 302, which uniquely identifies an instrumented sensor 205.

Additionally a sensor metadata node provides sensor metadata 303 which contains but is not limited to a sensor type, identifying the type of the sensor which may e.g. be a timing sensor type, measuring execution times or a counting sensor type, counting the executions of a method or suchlike; the name of the class which contains the sensor; the name of the method the sensor is injected to; the signature of said method; and the line number of the source code where the sensor 205 is placed.

A sensor metadata node 301 also contains metadata describing the measurements generated by the referred sensor 304, which contains but is not limited to the type of the measurements, and the unit of the measurement.

An event record 401, which is used to convey measurement data acquired by instrumented sensors 205 from the application 201 to the monitoring server 215, is displayed in FIG. 4. An event record 401 contains the field sensorId 402 which uniquely identifies the sensor 205 that generated the event record and which is used to correlate the measurement data included in the event record 401 with metadata describing the sensor that generated the event record 401. The measurement data 403 of an event record 401 contains the measurement value acquired by an instrumented sensor 205 at a specific measurement. The measurement data contains but is not limited to execution counters, reflecting the number of times a method or function has been executed, captured argument values of a specific method or function invocation, CPU time required for a specific invocation, or execution duration of a specific method or function invocation.

FIG. 5 depicts the process of instrumenting original bytecode 203 received from the application 201, with sensors 205 and loading the instrumented bytecode 204 instead of the original bytecode 203. Agent 202 and instrumentation engine 214 collaborate to perform the instrumentation of the bytecode.

FIG. 5a shows the process of capturing original bytecode 203, and requesting instrumentation of the bytecode by the instrumentation engine 214, from the monitoring server 215. When the virtual machine of the application 201 initiates loading of bytecode, the agent 202 intercepts the loading process and captures the original bytecode 203 before it is loaded. The captured original bytecode 203 is sent to the monitoring server 215 for instrumentation. The agent 202 waits until it receives the instrumented bytecode 204 from the monitoring server 215 and forwards the received instrumented bytecode 204 to the bytecode loading process of the virtual machine of the application 201, which loads the instrumented bytecode 204 instead of the original bytecode 203.

FIG. 5b shows the tasks performed by the monitoring server 215 to instrument sensors 205 into received original bytecode 203. If the monitoring server 215 receives original bytecode 203, it forwards the bytecode to the instrumentation engine 214 for instrumentation. The instrumentation engine 214 first extracts metadata from the received bytecode which is required to identify the class and methods represented by the received original bytecode 203. The extracted metadata is used for selection of sections of the original bytecode which should be instrumented. Selection might be performed by comparing extracted class name and method names with user defined class and method names, or it may use a rule based system which selects methods matching a set of user defined rules.

Parameterized sensor code is inserted into the bytecode of the selected methods in a subsequent step, which is described in detail in FIG. 6. After the sensors 205 are placed, the instrumented bytecode 204 is sent back to the agent 202.

The preferred embodiment performs instrumentation of original bytecode 203 during loading of the bytecode, but instrumentation of original bytecode may also be performed on user request by redefining bytecode during application runtime if the underlying virtual machine supports bytecode redefinition.

The process depicted in FIG. 6 inserts sensor bytecode into received original bytecode and generates information required to correlate received measurement data with the sensor that created the measurement data. Correlation allows to reconstruct the semantic of the received measurement data, like e.g. class or method of the monitored application into which the sensor that was injected. First, a sensor metadata node 301 with a unique sensorId 302 is created. The sensor metadata 303 of the sensor metadata node 301 is initialized with the metadata previously extracted from the received original bytecode 203, as depicted in FIG. 5b. The stored sensor metadata 303 allows to identify the type of the placed sensor, as well as its location within the application 201 bytecode, which is required for later correlation of measurement data created by the sensor. Additionally, metadata describing the measurement data generated by the sensor 304 is stored in the sensor metadata node 301. The initialized sensor metadata node is inserted into the sensor metadata repository. In a subsequent step, the bytecode representing the sensor to instrument is selected and parameterized with the previously created unique sensorId 302. The sensorId 302 is stored within the bytecode of the sensor and used to initialize event records 401 created by the instrumented sensor 205. The sensorId 302, which identifies the sensor metadata node 301 describing the sensor 205 that created the event record 401, allows to correlate received event records 401 with the sensor metadata node 301 which describes the sensor 205 that generated and sent the event records 401. The parameterized sensor bytecode is injected into the received original bytecode 204.

FIG. 7 schematically shows the execution of a sensor 205. If instrumented bytecode is executed by the application 201, bytecode of one or more instrumented sensors 205 is executed. On execution, a sensor 205 first creates an event record 401 and sets the sensorId 402 of the event record to the value assigned to the sensor during instrumentation, as depicted in FIG. 6. In a subsequent step, the sensor retrieves measurement data and stores it in the previously created event record 401. The initialized event record is placed in the fixed size event buffer 207 provided by the agent 202 and execution of the monitored bytecode continues.

The process depicted in FIG. 8 shows the sending of event records 401 stored in the fixed size event buffer 207 of the agent 202 to the monitoring server 215. The agent 202 cyclically starts a process that sends event records 401 stored in the fixed size event buffer 207 to the monitoring server 215. Event records 401 which have been sent to the monitoring server 215 are deleted from the event buffer 207 in a subsequent step.

FIG. 9 depicts the process of correlating received event records 401 with the metadata describing the sensors 205 that created the event records. After an event record 401 is received by the instrumentation server 215, it is inserted into the event collector 210 which forwards the event record to the event correlation module 211. The event correlation module 211 first reads the sensorId 402 of the received event record 401 and queries the sensor metadata repository 216 for a sensor metadata node 301 with a matching sensorId 302. If a matching sensor metadata node 301 is found in the sensor metadata repository 216, a reference to the matching sensor metadata node 301 is added to the received event record 401 and the event record 401 is inserted into the measurement buffer 212. If no matching sensor metadata node 301 is found for a received event record 401, the event record is discarded.

The analysis module 213 reads the event records 401 stored in the measurement buffer 212 and uses the reference to the matching sensor metadata node 301 added during event correlation to reconstruct the semantic of the analyzed event records.

The invention claimed is:

1. A method to process application performance data, the method performed by at least one computer processor executing computer-readable instructions tangibly stored on at least one computer-readable medium, the method comprising the steps of:
(A) injecting an agent into a monitored application;
(B) at the agent:
  (B)(1) capturing original byte code of the monitored application;
  (B)(2) sending the captured byte code of the monitored application to a monitoring server external to the monitored application;
(C) at an instrumentation engine in the monitoring server:
  (C)(1) inserting sensor bytecode into the captured original bytecode to generate instrumented byte code at runtime of the application and without altering source code of the application;
  (C)(2) transmitting the instrumented byte code to the monitored application;
(D) at the monitored application:
  (D)(1) loading the instrumented byte code instead of the original bytecode;
  (D)(2) executing the sensor bytecode to generate measurement data which describes performance characteristics of the original bytecode; and
  (D)(3) writing the measurement data to a data set of fixed size.

2. The method of claim 1, wherein (B)(1) comprises capturing the original byte code by interrupting the loading of the byte code.

3. The method of claim 1, wherein (C) further comprises:
(C)(3) generating metadata describing the instrumented byte code;
(C)(4) storing said metadata in a sensor metadata node external to the monitored application;
(C)(5) applying a key to the instrumented byte code which identifies the metadata describing the instrumented byte code; and
(C)(6) correlating measurement data generated by a specific portion of instrumented byte code with the metadata describing the specific portion of instrumented byte code external to the monitored application.

4. The method of claim 1, wherein (D) further comprises:
(D)(4) before (D)(1), receiving the instrumented bytecode from the instrumentation engine; and
(D)(5) before (D)(1), forwarding the instrumented bytecode to a bytecode loading process.

5. The method of claim 1:
wherein (D)(2) comprises executing the sensor bytecode to generate the measurement data without blocking execution of the monitored application; and
wherein (D) further comprises:
(D)(4) tagging the measurement data with a unique sensor identifier (ID) of the sensor bytecode without blocking execution of the monitored application; and
wherein (D)(3) comprises storing a first event record in an event buffer in the application, wherein the first event record includes the measurement data and the sensor ID, without blocking execution of the monitored application.

6. The method of claim 1, wherein the data set of fixed size comprises an event buffer, wherein the event buffer is a ring buffer of fixed size, and wherein the method further comprises:
(E) at the agent in the application:
  (E)(1) transmitting the first event record to the monitoring server asynchronously with a second event record being written to the event buffer; and
  (E)(2) repeating (E)(1) cyclically;
(F) at the monitoring server:
  (F)(1) receiving the first event record; and
  (F)(2) extracting the unique sensor ID from the first event record.

7. The method of claim 3, wherein the metadata comprises at least one of: (1) a class name of a class into which the sensor bytecode was inserted; (2) a method name of a method into which the sensor bytecode was inserted; and (3) a unique sensor identifier (ID) associated with the inserted sensor bytecode.

8. The method of claim 3, wherein (C) further comprises:
(C)(7) parameterizing the sensor bytecode with a unique sensor identifier (ID) identifying the metadata about the inserted sensor bytecode; and
wherein (C)(1) comprises inserting the parameterized sensor bytecode into the captured original bytecode to generate the instrumented bytecode.

9. The method of claim 6, wherein (E) further comprises:
(E)(3) reading the second event record from the event buffer simultaneously with storing the first event record in the event buffer.

10. The method of claim 6, wherein (F) further comprises:
(F)(3) determining whether a sensor metadata repository contains the unique sensor ID; and
(F)(4) if the sensor metadata repository is determined to include a sensor metadata node having the unique sensor ID, then:
  (F)(4)(a) adding a reference to the sensor metadata node to the first event record to produce a first updated event record; and
  (F)(4)(b) inserting the first updated event record into a measurement buffer at the monitoring server.

11. The method of claim 9, wherein the event buffer in the application comprises a ring buffer of fixed size.

12. A computer-readable medium comprising computer-readable instructions tangibly stored on the computer-readable medium, wherein the computer-readable instructions are executable by at least one computer processor to cause a monitoring server to perform a method, the method comprising:
(A) injecting an agent into a monitored application;
(B) at the agent:

(B) (1) capturing original byte code of the monitored application;

(B) (2) sending the captured byte code of the monitored application to a monitoring server external to the monitored application;

(C) at an instrumentation engine in the monitoring server:

(C) (1) inserting sensor bytecode into the captured original bytecode to generate instrumented byte code at runtime of the application and without altering source code of the application;

(C) (2) transmitting the instrumented byte code to the monitored application;

(D) at the monitored application:

(D) (1) loading the instrumented byte code instead of the original bytecode;

(D) (2) executing the sensor bytecode to generate measurement data which describes performance characteristics of the original bytecode; and (D) (3) writing the measurement data to a data set of fixed size.

13. The computer-readable medium of claim 12, wherein (B) (1) comprises capturing the original byte code by interrupting the loading of the byte code.

14. The computer-readable medium of claim 12, wherein (C) further comprises:

(C) (3) generating metadata describing the instrumented byte code;

(C) (4) storing said metadata in a sensor metadata node external to the monitored application;

(C) (5) applying a key to the instrumented byte code which identifies the metadata describing the instrumented byte code; and (C) (6) correlating measurement data generated by a specific portion of instrumented byte code with the metadata describing the specific portion of instrumented byte code external to the monitored application.

15. The computer-readable medium of claim 12, wherein (D) further comprises:

(D) (4) before (D) (1), receiving the instrumented bytecode from the instrumentation engine; and (D) (5) before (D)(1), forwarding the instrumented bytecode to a bytecode loading process.

16. The computer-readable medium of claim 12:

wherein (D) (2) comprises executing the sensor bytecode to generate the measurement data without blocking execution of the monitored application; and wherein (D) further comprises:

(D) (4) tagging the measurement data with a unique sensor identifier (ID) of the sensor bytecode without blocking execution of the monitored application; and wherein (D) (3) comprises storing a first event record in an event buffer in the application, wherein the first event record includes the measurement data and the sensor ID, without blocking execution of the monitored application.

17. The computer-readable medium of claim 12, wherein the data set of fixed size comprises an event buffer, wherein the event buffer is a ring buffer of fixed size, and wherein the method further comprises:

(E) at the agent in the application:

(E) (1) transmitting the first event record to the monitoring server asynchronously with a second event record being written to the event buffer; and (E) (2) repeating (E) (1) cyclically;

(F) at the monitoring server:

(F) (1) receiving the first event record; and (F) (2) extracting the unique sensor ID from the first event record.

18. The computer-readable medium of claim 14, wherein the metadata comprises at least one of: (1) a class name of a class into which the sensor bytecode was inserted; (2) a method name of a method into which the sensor bytecode was inserted; and (3) a unique sensor identifier (ID) associated with the inserted sensor bytecode.

19. The computer-readable medium of claim 14, wherein (C) further comprises:

(C) (7) parameterizing the sensor bytecode with a unique sensor identifier (ID) identifying the metadata about the inserted sensor bytecode; and wherein (C) (1) comprises inserting the parameterized sensor bytecode into the captured original bytecode to generate the instrumented bytecode.

20. The computer-readable medium of claim 17, wherein (E) further comprises:

(E) (3) reading the second event record from the event buffer simultaneously with storing the first event record in the event buffer.

21. The computer-readable medium of claim 17, wherein (F) further comprises:

(F) (3) determining whether a sensor metadata repository contains the unique sensor ID; and (F) (4) if the sensor metadata repository is determined to include a sensor metadata node having the unique sensor ID, then:

(F) (4) (a) adding a reference to the sensor metadata node to the first event record to produce a first updated event record; and (F) (4) (b) inserting the first updated event record into a measurement buffer at the monitoring server.

22. The computer-readable medium of claim 20, wherein the event buffer in the application comprises a ring buffer of fixed size.

23. A computer-implemented method performed by a monitoring server, the method comprising:

(A) receiving original bytecode of an application from an agent, wherein the agent is in the application and external to the monitoring server;

(B) inserting sensor bytecode into the captured original bytecode to generate instrumented bytecode at runtime of the application and without altering source code of the application;

(C) transmitting the instrumented bytecode to the agent;

(D) generating metadata about the context of the inserted sensor bytecode; and (E) storing the metadata in a sensor metadata node external to the application.

24. The method of claim 23, wherein the context data comprises at least one of: (1) a class name of a class into which the sensor bytecode was inserted; (2) a method name of a method into which the sensor bytecode was inserted; and a unique sensor identifier (ID) associated with the inserted sensor bytecode.

25. The method of claim 23, further comprising:

(F) before (B), parameterizing the sensor bytecode with a unique sensor identifier (ID) identifying the metadata about the inserted sensor bytecode; and wherein (B) comprises inserting the parameterized sensor bytecode into the captured original bytecode to generate the instrumented bytecode.

26. A computer-readable medium comprising computer-readable instructions tangibly stored on the computer-readable medium, wherein the computer-readable instructions are executable by at least one computer processor to cause a monitoring server to perform a method, the method comprising:
- (A) receiving original bytecode of an application from an agent, wherein the agent is in the application and external to the monitoring server;
- (B) inserting sensor bytecode into the captured original bytecode to generate instrumented bytecode at runtime of the application and without altering source code of the application;
- (C) transmitting the instrumented bytecode to the agent;
- (D) generating metadata about the context of the inserted sensor bytecode; and
- (E) storing the metadata in a sensor metadata node external to the application.

27. The computer-readable medium of claim 26, wherein the context data comprises at least one of: (1) a class name of a class into which the sensor bytecode was inserted; (2) a method name of a method into which the sensor bytecode was inserted; and a unique sensor identifier (ID) associated with the inserted sensor bytecode.

28. The computer-readable medium of claim 26, further comprising:
- (F) parameterizing the sensor bytecode with a unique sensor identifier (ID) identifying the metadata about the inserted sensor bytecode; and
- wherein (B) comprises inserting the parameterized sensor bytecode into the captured original bytecode to generate the instrumented bytecode.

29. A computer-implemented method for use with an application and a monitoring server, wherein the monitoring server is external to the application, wherein the application includes instrumented bytecode, and wherein the instrumented bytecode includes original bytecode and sensor bytecode inserted into the original bytecode, the method comprising:
- (A) at an application, without blocking execution of the application, executing the sensor bytecode to:
  - (A) (1) generate measurement data which describes performance characteristics of the original bytecode into which the sensor bytecode is inserted;
  - (A) (2) tag the measurement data with a unique sensor identifier (ID) of the sensor bytecode;
  - (A) (3) storing a first event record in an event buffer in the application, wherein the first event record includes the measurement data and the sensor ID;
- (B) at an agent in the application:
  - (B) (1) transmitting the first event record to the monitoring server asynchronously with a second event record being written to the event buffer; and
  - (B) (2) repeating (B) (1) cyclically;
- (C) at the monitoring server;
  - (C) (1) receiving the first event record; and
  - (C) (2) extracting the unique sensor ID from the first event record.

30. The method of claim 29, wherein (B) further comprises:
- (B) (3) reading the second event record from the event buffer simultaneously with storing the first event record in the event buffer.

31. The method of claim 29, wherein the event buffer in the application is a ring buffer of fixed size.

32. The method of claim 29, wherein (C) further comprises:
- (C) (1) determining whether a sensor metadata repository contains the unique sensor ID; and
- (C) (2) if the sensor metadata repository is determined to include a sensor metadata node having the unique sensor ID, then:
  - (C) (4) (a) adding a reference to the sensor metadata node to the first event record to produce a first updated event record;
  - (C) (4) (b) and inserting the first updated event record into a measurement buffer at the monitoring server.

33. A computer-readable medium comprising computer-readable instructions tangibly stored on the computer-readable medium, wherein the computer-readable instructions are executable by at least one computer processor to perform a method for use with an application and a monitoring server, wherein the monitoring server is external to the application, wherein the application includes instrumented bytecode, and wherein the instrumented bytecode includes original bytecode and sensor bytecode inserted into the original bytecode, the method comprising:
- (A) at an application, without blocking execution of the application, executing the sensor bytecode to:
  - (A) (1) generate measurement data which describes performance characteristics of the original bytecode into which the sensor bytecode is inserted;
  - (A) (2) tag the measurement data with a unique sensor identifier (ID) of the sensor bytecode;
  - (A) (3) storing a first event record in an event buffer in the application, wherein the first event record includes the measurement data and the sensor ID;
- (B) at an agent in the application:
  - (B) (1) transmitting the first event record to the monitoring server asynchronously with a second event record being written to the event buffer; and
  - (B) (2) repeating (B) (1) cyclically;
- (C) at the monitoring server;
  - (C) (3) receiving the first event record; and
  - (C) (4) extracting the unique sensor ID from the first event record.

34. The computer-readable medium of claim 33, wherein (B) further comprises:
- (B) (3) reading the second event record from the event buffer simultaneously with storing the first event record in the event buffer.

35. The computer-readable medium of claim 33, wherein the event buffer in the application is a ring buffer of fixed size.

36. The computer-readable medium of claim 33, wherein (C) further comprises:
- (C) (5) determining whether a sensor metadata repository contains the unique sensor ID; and
- (C) (6) if the sensor metadata repository is determined to include a sensor metadata node having the unique sensor ID, then:
  - (C) (4) (c) adding a reference to the sensor metadata node to the first event record to produce a first updated event record;
  - (C) (4) (d) and inserting the first updated event record into a measurement buffer at the monitoring server.

37. A computer-implemented method performed by an application, wherein the application includes instrumented bytecode, and wherein the instrumented bytecode includes original bytecode and sensor bytecode inserted into the original bytecode, the method comprising:
- (A) without blocking execution of the application, executing the sensor bytecode to:
  - (A) (1) generate measurement data which describes performance characteristics of the original bytecode into which the sensor bytecode is inserted;

(A) (2) tag the measurement data with a unique sensor identifier (ID) of the sensor bytecode;
(A) (3) storing a first event record in a buffer in the application, wherein the first event record includes the measurement data and the sensor ID;
(B) at an agent in the application:
(B) (1) transmitting the first event record to a monitoring server external to the application asynchronously with a second event record being written to the buffer; and
(B) (2) repeating (B) (1) cyclically.

38. The method of claim 37, wherein (B) further comprises:
(B) (3) reading the second event record from the buffer simultaneously with storing the first event record in the buffer.

39. The method of claim 37, wherein the buffer in the application is a ring buffer of fixed size.

40. A computer-readable medium comprising computer-readable instructions tangibly stored on the computer-readable medium, wherein the computer-readable instructions are executable by at least one computer processor to cause an application to perform a method, wherein the application includes instrumented bytecode, and wherein the instrumented bytecode includes original bytecode and sensor bytecode inserted into the original bytecode, the method comprising:
(A) without blocking execution of the application, executing the sensor bytecode to:
(A) (1) generate measurement data which describes performance characteristics of the original bytecode into which the sensor bytecode is inserted;
(A) (2) tag the measurement data with a unique sensor identifier (ID) of the sensor bytecode;
(A) (3) storing a first event record in a buffer in the application, wherein the first event record includes the measurement data and the sensor ID;
(B) at an agent in the application:
(B) (1) transmitting the first event record to a monitoring server external to the application asynchronously with a second event record being written to the buffer; and
(B) (2) repeating (B) (1) cyclically.

41. The computer-readable medium of claim 40, wherein (B) further comprises:
(B) (3) reading the second event record from the buffer simultaneously with storing the first event record in the buffer.

42. The computer-readable medium of claim 40, wherein the buffer in the application is a ring buffer of fixed size.

* * * * *

UNITED STATES PATENT AND TRADEMARK OFFICE
CERTIFICATE OF CORRECTION

| | | |
|---|---|---|
| PATENT NO. | : 7,957,934 B2 | Page 1 of 1 |
| APPLICATION NO. | : 12/120645 | |
| DATED | : June 7, 2011 | |
| INVENTOR(S) | : Bernd Greifeneder | |

It is certified that error appears in the above-identified patent and that said Letters Patent is hereby corrected as shown below:

On the first page, in field (54), in "Title", in column 1, line 3, delete "OUSIDE" and insert -- OUTSIDE --, therefor.

In column 1, line 3, delete "OUSIDE" and insert -- OUTSIDE --, therefor.

In column 4, line 5, delete "anaylsis" and insert -- analysis --, therefor.

In column 9, line 30, in Claim 1, delete "(B)(1)" and insert -- (B) (1) --, therefor.

In column 11, line 42, in Claim 15, delete "(D)(1)," and insert -- (D) (1), --, therefor.

Signed and Sealed this
Twenty-third Day of August, 2011

David J. Kappos
*Director of the United States Patent and Trademark Office*